(12) United States Patent
Kuwajima

(10) Patent No.: US 11,494,685 B2
(45) Date of Patent: Nov. 8, 2022

(54) LEARNING SYSTEM, IN-VEHICLE DEVICE, AND SERVER

(71) Applicant: DENSO CORPORATION, Kariya (JP)

(72) Inventor: Hiroshi Kuwajima, Menlo Park, CA (US)

(73) Assignee: DENSO CORPORATION, Kariya (JP)

( * ) Notice: Subject to any disclaimer, the term of this patent is extended or adjusted under 35 U.S.C. 154(b) by 821 days.

(21) Appl. No.: 14/597,386

(22) Filed: Jan. 15, 2015

(65) Prior Publication Data

US 2015/0199617 A1 Jul. 16, 2015

(30) Foreign Application Priority Data

Jan. 16, 2014 (JP) .............................. JP2014-005925

(51) Int. Cl.
*G06N 99/00* (2019.01)
*G06N 20/00* (2019.01)
*G06N 5/02* (2006.01)
*G06V 20/56* (2022.01)

(52) U.S. Cl.
CPC .............. *G06N 20/00* (2019.01); *G06N 5/02* (2013.01); *G06V 20/56* (2022.01)

(58) Field of Classification Search
CPC ..... G06K 9/00791; G06N 99/005; G06N 5/02
See application file for complete search history.

(56) References Cited

U.S. PATENT DOCUMENTS

| 9,015,093 | B1* | 4/2015 | Commons | .......... | G01C 21/3602 |
| | | | | | 701/23 |
| 2003/0050742 | A1 | 3/2003 | Sakamoto et al. | | |
| 2004/0176958 | A1* | 9/2004 | Salmenkaita | ..... | H04M 1/72561 |
| | | | | | 704/275 |

(Continued)

FOREIGN PATENT DOCUMENTS

| EP | 1975558 A2 | 10/2008 |
| EP | 2214122 A1 | 8/2010 |

(Continued)

OTHER PUBLICATIONS

Megherbi et al., "A Hybrid P2P and Master-Slave Architectur for Intelligent Multi-Agent Reinforcement Learning in a Distributed Computing Environment: A Case Study", IEEE International Conference on Computational Intelligence for Measurement Systems.*

(Continued)

*Primary Examiner* — Tsu-Chang Lee
(74) *Attorney, Agent, or Firm* — Posz Law Group, PLC

(57) ABSTRACT

At least one device is configured to perform a predetermined process associated with a vehicle using data; and send, to a server system, the data used by the predetermined process as learning data. The server system is configured to obtain the learning data sent from the at least one device, and perform a learning process on at least a factor defining the predetermined process using the obtained learning data to generate update data for updating at least the factor defining the predetermined process. The server system is configured to (Continued)

send the update data to the at least one device. The at least one device is further configured to update at least the factor defining the predetermined process based on the update data sent from the server system.

17 Claims, 6 Drawing Sheets

(56) References Cited

U.S. PATENT DOCUMENTS

2006/0015561 A1    1/2006   Murphy et al.
2008/0073057 A1    3/2008   Kojima et al.

FOREIGN PATENT DOCUMENTS

| JP | 2006-12165 A | 1/2006 |
|---|---|---|
| JP | 2011-053798 A | 3/2011 |
| JP | 2012-059058 A | 3/2012 |
| WO | 2013-173911 A1 | 11/2013 |

OTHER PUBLICATIONS

Li, et al., "Detection, Classification, and Tracking of Targets", IEEE Signal Processing Magazine, Mar. 2002 (Year: 2002).*
Brooks, et al., "Distributed Target Classification and Tracking in Sensor Networks", Proceedings of the IEEE, vol. 91, No. 8, Aug. 2003 (Year: 2003).*
Extended European Search Report dated Jun. 17, 2015 in the corresponding EP application No. 15151305.8.
Mu Li et al., "Communication Efficient Distributed Machine Learning with the Parameter Server" in "Advances in Neural Information Processing Systems 27"; Jan. 1, 2014; vol. 17, pp. 19-27; Curran Associates, Inc.; XP055546457, ISSN: 1424-8220.
Li Deng et al., "Deep Learning for Signal and Information Processing"; Jan. 1, 2013; pp. 1-91; Microsoft Research, Redmond, Washington, USA; XP055546469; Retrieved from the Internet on Jan. 23, 2019; URL: https://pdfs.semanticscholar.org/dd34/527d4db885557c545f03e3fe5563d5e8b8cb.pdf.

* cited by examiner

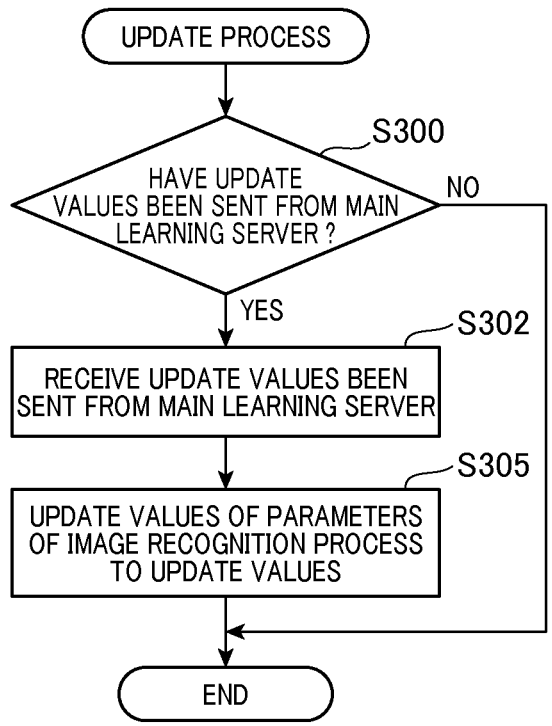

LEARNING SYSTEM, IN-VEHICLE DEVICE, AND SERVER

CROSS REFERENCE TO RELATED APPLICATION

This application is based on and claims the benefit of priority from Japanese Patent Application No. 2014-005925, filed on Jan. 16, 2014, which is incorporated in its entirety herein by reference.

TECHNICAL FIELD

The present disclosure relates to learning systems for learning a process carried out by an in-vehicle device.

BACKGROUND

Machine learning is conventionally used for various fields, such as image recognition, voice recognition, and others.

Generally, machine learning trains a process based on inputting a large amount of data to the process, thus improving the accuracy of achieving desired results from the process.

An example of machine learning is disclosed in Japanese Patent Laid-Open No. 2006-12165.

The Patent Publication No. 2006-12165 discloses updating, i.e. training, partially the filtering process of a spam filter, which removes spam mails from received mails, using machine learning, thus improving the accuracy of distinguishing the spam mails from the other received mails.

In-vehicle devices perform an image recognition process and/or others. The accuracy of image recognition based on the image recognition process has been improved according to machine learning in a development phase of the in-vehicle devices.

SUMMARY

There is a requirement to enable execution of machine learning for common processes installed in in-vehicle devices even after shipment of the in-vehicle devices. This requirement aims to individually improve the performances of the respective in-vehicle devices depending on their different circumstances of the corresponding vehicles.

As described above, machine learning for a process installed in a shipped in-vehicle device requires a large amount of data. For this reason, if the in-vehicle device is configured to execute machine learning for the process while parallely operating the process, it may be necessary to improve the hardware performance of the in-vehicle device. This may result in an increase of the cost of the in-vehicle device.

In view the circumstances set forth above, one aspect of the present disclosure seeks to provide learning systems each including at least one in-vehicle device and a server; each of the learning systems is capable of addressing the requirement and problem set forth above.

Specifically, an alternative aspect of the present disclosure aims to provide such learning systems, each of which is capable of performing machine learning for a process installed in the at least one in-vehicle device without improvement of the hardware performance of the at least one in-vehicle device.

A further aspect of the present disclosure aims to provide an in-vehicle device capable of updating the process installed therein without performing machine learning.

A still further aspect of the present invention aims to provide a server enabling an in-vehicle device to update the process installed in the in-vehicle device without performing machine learning.

According to a first exemplary aspect of the present disclosure, there is provided a learning system. The learning system includes at least one device installed in a vehicle, and a server system communicably coupled to the at least one device. The at least one device includes a performing unit for performing a predetermined process associated with the vehicle using data, and a sending unit for sending, to the server system, the data used by the performing means as learning data. The server system includes an obtaining unit for obtaining the learning data sent from the at least one device. The server system includes a performing unit for performing a learning process on at least a factor defining the predetermined process using the obtained learning data to generate update data for updating at least the factor defining the predetermined process. The server system includes a sending unit for sending the update data to the at least one device. The at least one device further includes an updating unit for updating at least the factor defining the predetermined process based on the update data sent from the server system.

According to a second exemplary aspect of the present disclosure, there is provided a device installed in a vehicle. The device includes a performing unit for performing a predetermined process associated with the vehicle using data. The device includes a sending unit for sending, to a server system, the data used by the performing means as learning data. The device includes a receiving unit for, when update data for updating at least a factor defining the predetermined process is sent from the server as a result of a learning process performed by the server system, receiving the update data. The device includes an updating unit for updating at least the factor defining the predetermined process based on the update data received by the receiving unit.

According to a third exemplary aspect of the present disclosure, there is provided a server system. The server system includes an obtaining unit for obtaining learning data sent from at least one device installed in a vehicle. The learning data is data used by the at least one device during execution of a predetermined process associated with the vehicle. The server system includes a performing unit for performing a learning process on at least a factor defining the predetermined process using the obtained learning data to generate update data for updating at least the factor defining the predetermined process. The server system includes a sending unit for sending the update data to the at least one device.

The learning system, the device, and the server system according to these exemplary aspects of the present disclosure make it possible to cause the server system to perform the learning process on at least one factor defining the predetermined process carried by the device to obtain update data for the at least one factor defining the predetermined process as a result of the learning process. This eliminates, from the device, a task of executing the learning process based on learning data collected from the device.

The learning system, the device, and the server system according to these exemplary aspects of the present disclosure also make it possible to send the update data to the device. This permits the device to update the at least one factor defining the predetermined process based on the update data sent from the server system without performing the task of executing the learning process. Thus, the learning system, the device, and the server system according to these exemplary aspects of the present disclosure are capable of updating the at least one factor defining the predetermined process carried out by the device without improving the hardware performance of the device even after shipment of the device.

BRIEF DESCRIPTION OF THE DRAWINGS

Other aspects of the present disclosure will become apparent from the following description of embodiments with reference to the accompanying drawings in which:

FIG. 8 is a flowchart schematically illustrating an example of an update process carried out by each of the in-vehicle devices.

DETAILED DESCRIPTION OF EMBODIMENT

A specific embodiment of the present disclosure will be described hereinafter with reference to the accompanying drawings.

Figure 1:
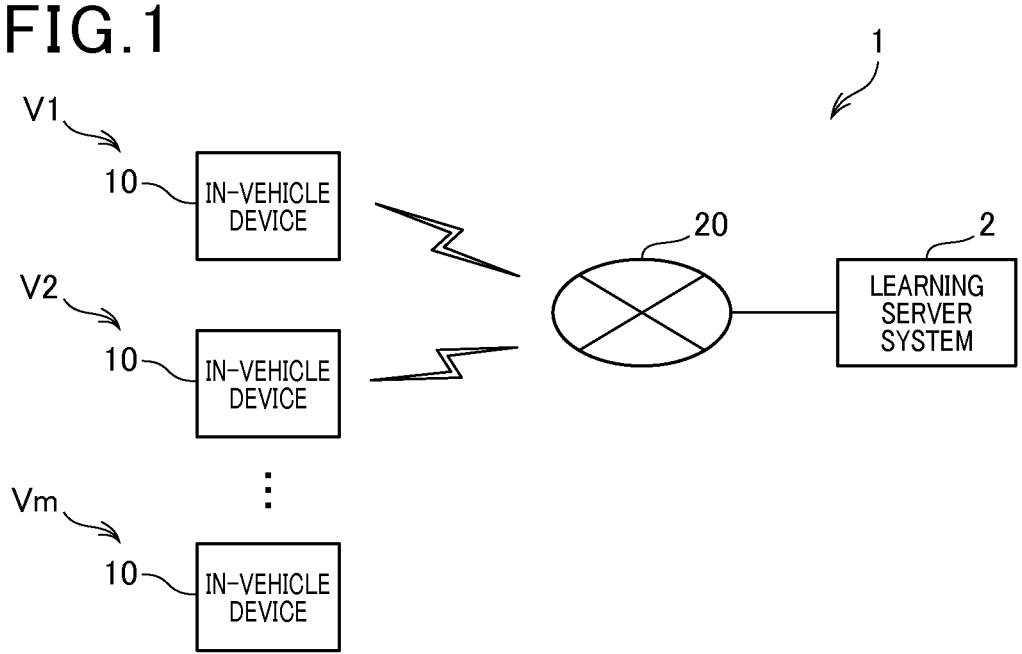
FIG. 1 is a block diagram schematically illustrating an example of the overall structure of a learning system according to an embodiment of the present disclosure.

A learning system 1 according to the specific embodiment has in-vehicle devices 10 and a learning server system 2 to communicate with each in-vehicle device 10 via a wireless communication network 20 (see FIG. 1). The in-vehicle devices 10 are respectively installed in a plurality of vehicles V (V1 to Vm; m is an integer equal to more than 2). For example, in this embodiment, there are many vehicles V1 to Vm, i.e. m is a large number, in which the in-vehicle devices V1 to Vm are respectively installed.

Figure 2:
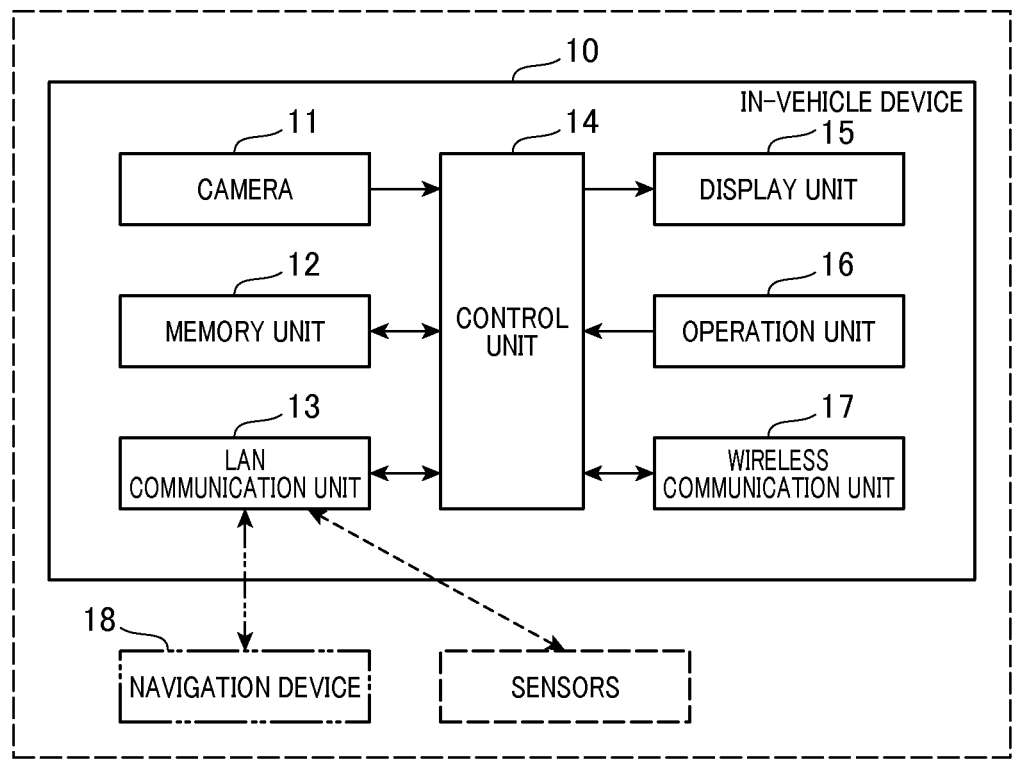
FIG. 2 is a block diagram schematically illustrating an example of a hardware structure of each of in-vehicle devices illustrated in FIG. 1.

Each of the in-vehicle devices 10 has an image recognition function to recognize pedestrians around a corresponding one of the vehicles V1 to Vm, colored lines painted on roads, and/or others. Each of the in-vehicle devices 10 has at least a camera 11, a memory unit 12, an on-board LAN communication unit 13, a control unit 14, a display unit 15, an operation unit 16, and a wireless communication unit 17 (see FIG. 2).

Each of the cameras 11 is configured of a CCD camera, an infrared camera, and/or others. Each of the cameras 11 is a unit to shoot images around a corresponding one of the vehicles V1 to Vm, and perform an image recognition process based on picked-up images. In addition to or in place of the camera 11, each in-vehicle device 10 can be equipped with one or more sensors, such as one or more radars, and can be operative to perform an image recognition process of recognizing pedestrians and others based on data measured by the one or more sensors.

Each of the memory units 12 is comprised of at least flash memory which does not need power to retain data. Each of the memory units 12 stores therein various types of information defining the image recognition process and/or other processes. For instance, the various types of information include parameters, at least one algorithm, and others defining the image recognition function, i.e. image recognition process.

For example, the at least one algorithm can be comprised of a neural-network algorithm that consists of a plurality of nodes, i.e. neurons, each of which is connected to at least one of the other nodes.

If the neural-network algorithm is designed as a hierarchical neural network algorithm, the hierarchical neural network algorithm is designed to have a predetermined connection pattern among plural nodes, i.e. classifiers, in an input layer, plural nodes in at least one hidden layer, and plural nodes in an output layer. Connection weight parameters between nodes of the different layers are set to preset values; the values of the connection weight parameters are to be trained by the learning server system 2. Specifically, when data d is sent from a first node included in an input layer to a second node included in at least one hidden layer while a connection weight parameter between the first and second nodes is set to k, a function of a data value d·k, which is represented as f(d·k), is input to the second node. As the function f(x), a linear function f(x)=x, or a sigmoid function f(x)=σy(x) or f(x)=tanh(x) can be used.

As another example, the image recognition process can be comprised of an SVM (Support Vector Machine) algorithm that consists of a plurality of classifiers that are connected to one another in a predetermined connection pattern, such as a cascade connection pattern. Like the neural-network algorithm, connection weight parameters between the classifiers are set to given values; the values of the connection weight parameters are to be trained by the learning server system 2.

Each of the on-board LAN communication units 13 communicates with other devices via an on-board LAN (not illustrated).

Each of the control units 14 is mainly comprised of a well-known microcomputer consisting of, for example, a CPU, a ROM, a RAM, an I/O, and a bus line through which the CPU, ROM, RAM, and I/O are communicably connected to each other. Each of the control units 14 performs integrated control of the in-vehicle device 10 in accordance with programs stored in the ROM, programs loaded in the RAM, and/or other programs.

Each of the control units 14 is operative to perform at least the image recognition process based on images picked up by the camera 11.

Each of the display units 15 is comprised of a liquid crystal display, and/or other display devices. Each of the display units 15 displays various types of information to, for example, one or more occupants including a driver of a corresponding one of the vehicles V1 to Vm.

Each of the operation units 16 is comprised of one or more input devices, such as a key switch, a touch switch, and others. Each of the operation units allows an occupant to operate the one or more input devices to enter various items of information based on the operation thereinto, and sends the entered various items of information to the control unit 14.

Each of the wireless communication units 17 accesses the wireless communication network 20 via an antenna and/or others, which are not illustrated in FIG. 1, thus communicating with the learning server system 2.

Each of the in-vehicle devices 10 may be comprised of another type of wireless communication device instead of the wireless communication unit 17. In this modification, the other type of wireless communication device accesses the wireless communication network 20 via the on-board LAN, thus communicating with the learning server system 2.

Figure 3:
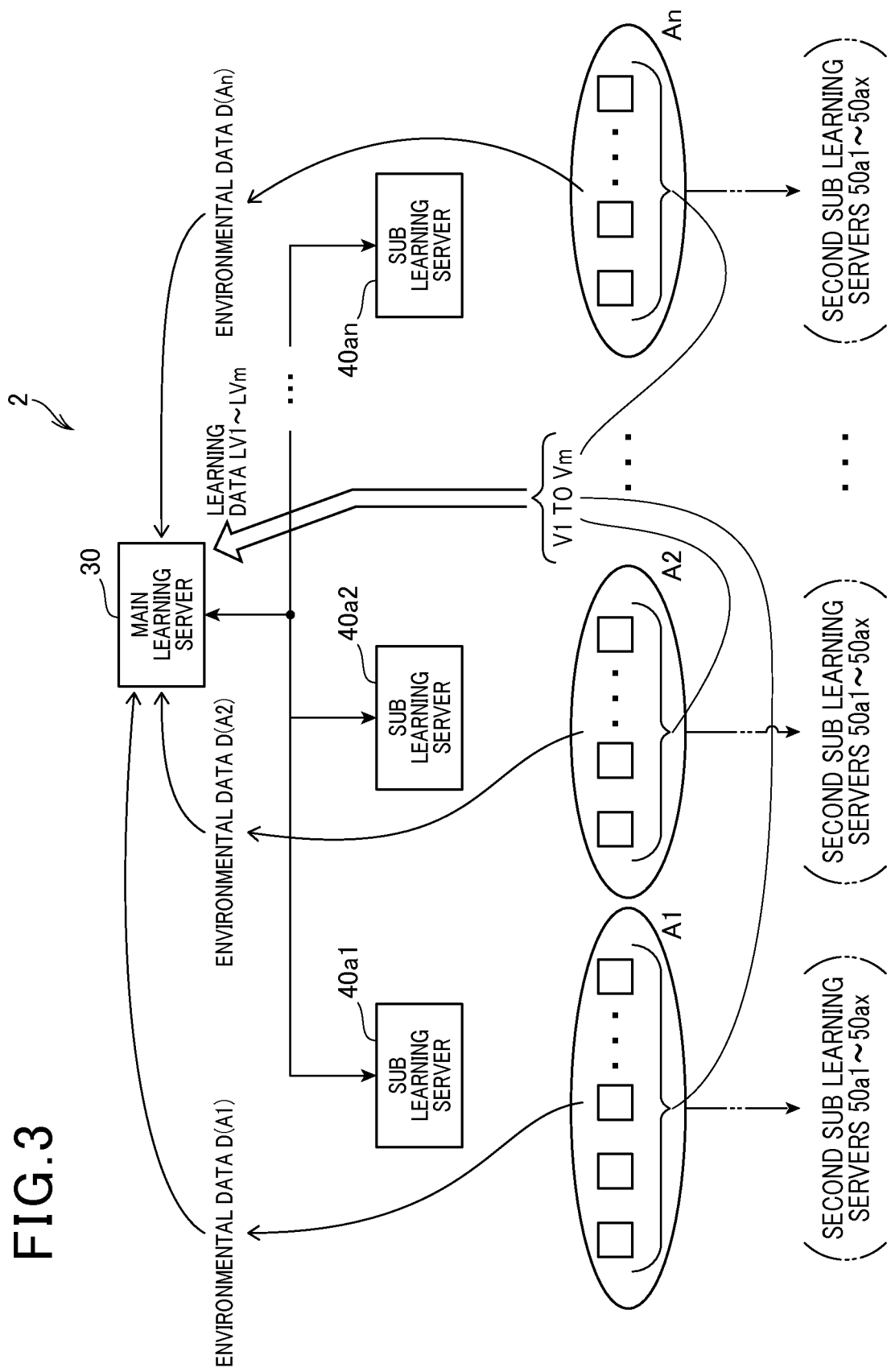
FIG. 3 is a view schematically illustrating an example of a hardware structure of a server system illustrated in FIG. 1 and illustrating travelable areas covered by respective sub servers of the server system.

Referring to FIG. 3, the learning server system 2 is comprised of a main learning server 30, a plurality of sub learning servers 40a1 to 40an (n is an integer equal to or more than 2), and others.

The plurality of sub learning servers 40a1 to 40an are provided to respectively cover a plurality of travelable areas A1 to An for the vehicles V1 to Vm in which the corresponding in-vehicle devices 10 are installed. Detailed descriptions of the travelable areas A1 to An will be provided later.

The servers 30 and 40a1 to 40an are connected with, for example, a LAN to communicate with each other through the LAN.

Figure 4A:
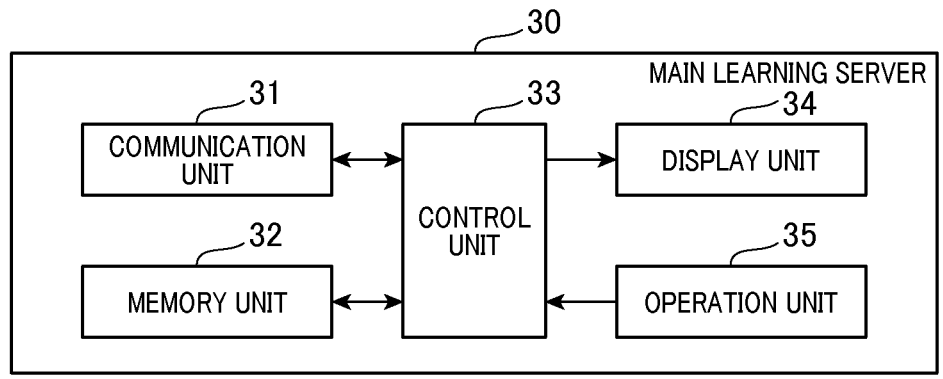
FIG. 4A is a block diagram schematically illustrating an example of a hardware structure of a main server illustrated in FIG. 3.

The main learning server 30 is comprised of, for instance, a computer circuit and peripherals of the computer circuit, and equipped with at least a communication unit 31, a memory unit 32, a control unit 33, a display unit 34, and an operation unit 35 (see FIG. 4A).

The communication unit 31 is a unit to access the wireless communication network 20 via the LAN, thus communicating with the sub learning servers 40a1 to 40an via the wireless communication network 20. The memory unit 32 is composed of a storage device, such as HDD, which does not need power to retain data.

The control unit 33 is mainly comprised of a well-known computer consisting of, for example, a CPU, a ROM, a RAM, an I/O, and a bus line through which the CPU, ROM, RAM, and I/O are communicably connected to each other. The control unit 33 operates in accordance with programs stored in the ROM, programs loaded in the RAM, and/or other programs.

The memory unit 32 stores therein the various types of information defining the image recognition process and/or other processes, which is similar to each of the in-vehicle devices 10.

The control unit 33 has a learning function of performing machine learning for the image recognition function, i.e. the image recognition process, installed in each of the in-vehicle devices 10. The learning function of the control unit 33 will be described in detail later.

Figure 4B:
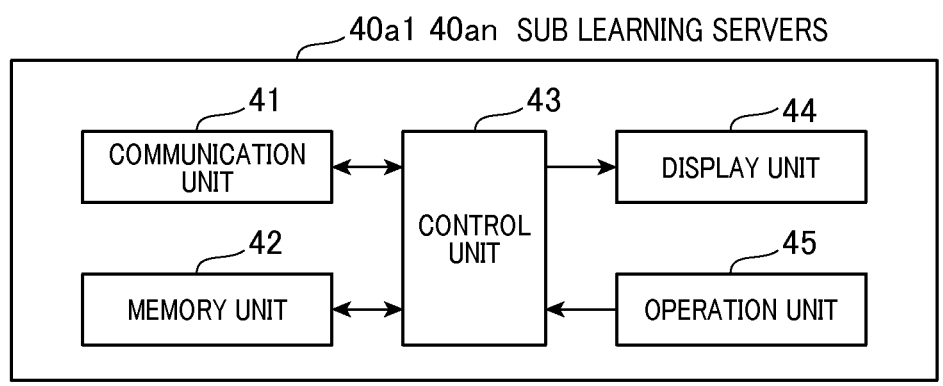
FIG. 4B is a block diagram schematically illustrating an example of a hardware structure of each of the sub servers illustrated in FIG. 3.

Like the main learning server 30, each of the sub learning servers 40a1 to 40an is comprised of, for instance, a computer circuit and peripherals of the computer circuit, and equipped with at least a communication unit 41, a memory unit 42, a control unit 43, a display unit 44, and an operation unit 45 (see FIG. 4B).

The memory unit 42 stores therein the various types of information defining the image recognition process and/or other processes, which is similar to each of the in-vehicle devices 10 and the main learning server 30. The control unit 43 has a learning function of performing machine learning for the image recognition function, i.e. the image recognition process, installed in each of the in-vehicle devices 10 in cooperation with the main learning server 30. The components 41 to 45 of each of the sub learning servers 40a1 to 40an are substantially functionally equivalent to those of the main learning server 30, so that the further descriptions of which are omitted.

Operations of the learning system 1 are described as follows.

The learning system 1 is configured such that the learning server system 2 performs machine learning for the image recognition function installed in each of the in-vehicle devices 10. That is, the learning server system 2 is in charge of the learning function.

Specifically, each of the in-vehicle devices 10 performs the image recognition process based on image data picked up by the camera 11. Each of the in-vehicle devices 10 transmits the image data used by the image recognition process to the learning server system 2 as learning data used for training the image recognition process.

The learning server system 2 receives the learning data, and performs a learning process on, for example, the parameters of the image recognition process based on the received learning data from each of the in-vehicle devices 10 in order to improve the recognition accuracy of the image recognition process. As a result of the learning process, the learning server system 2 generates update data to update the parameters of the image recognition process, and transmits the update data to each of the in-vehicle devices 10.

For instance, if the image recognition process is comprised of a neutral-network algorithm or SVM algorithm, the learning server system 2 can be configured to learn the connection weight parameters as the parameters of the image recognition process based on the received learning data from each of the in-vehicle devices 10.

When receiving the update data sent from the learning server system 2, each of the in-vehicle devices 10 updates the parameters of the image recognition process stored therein based on the received update data.

Processes executed by each of the in-vehicle devices 10 and the learning server system 2 are described in detail as follows.

Learning-Data Transmission Process

Figure 5:
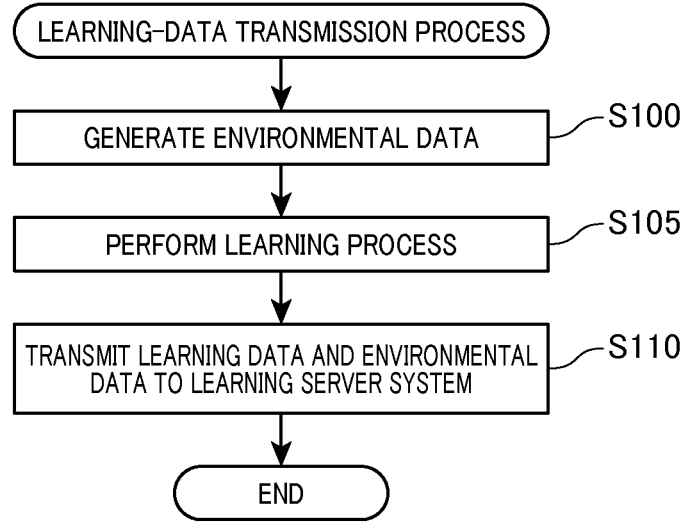
FIG. 5 is a flowchart schematically illustrating an example of a learning-data transmission process carried out by each of the in-vehicle devices.

Each of the in-vehicle devices 10 is configured to perform a learning-data transmission process to transmit, to the learning server system 2, the learning data, i.e., the image data taken with the camera 11 and used by the image recognition process. The learning-data transmission process will be described with a flowchart illustrated in FIG. 5.

Note that, for example, each of the in-vehicle devices 10 starts the learning-data transmission process parallely during execution of the image recognition process. In other words, each of the in-vehicle devices 10 performs the learning-data transmission process each time a corresponding one of the in-vehicle devices 10 performs the image recognition process.

At step S100, each of the control units 14 identifies a current travelable area in which a corresponding one of the vehicles V1 to Vm is being currently located, for example, is currently travelling, from the travelable areas A1 to An, and obtains environmental data associated with at least one of the environments of the periphery of a corresponding vehicle V and the environments of a corresponding vehicle V itself.

For example, an overall region in which the vehicles V1 to Vm can travel are divided into the plurality of travelable areas A1 to An.

For example, the environmental data for each of the travelable areas A1 to An includes environmental information about a corresponding one of the travelable areas A1 to An, such as the situations of the roads included in a corresponding one of the travelable areas A1 to An.

Specifically, for instance, each of the vehicles V1 to Vm can be provided with a navigation device 18 (see FIG. 2) communicably connected to the on-board LAN communication unit 13. The navigation device 18 of each vehicle is capable of detecting the current location of the vehicle, and determining and displaying, on a map displayed on a monitor thereof, the best route to a specified destination from the current location of the vehicle.

Each of the control units 14 can communicate with the navigation device 18 via the on-board LAN communication unit 13, and acquire the current location of a corresponding one of the vehicles V1 to Vm from the navigation device 18. Then, each of the control units 14 can identify a current travelable area in which the current location is included. This makes it possible for each of the control units 14 to obtain the environmental data for the current location of a corresponding one of the vehicles V1 to Vm.

Additionally, in each of the memory units 12, information about a travelable area in the travelable areas A1 to An, in which a corresponding one of the vehicles V1 to Vm is scheduled to travel, can be stored. In this modification, each of the control units 14 can identify a current travelable area based on the information stored in the memory unit 12.

After the operation in step S100, the learning-data transmission process proceeds to step S105.

At step S105, each of the control units 14 performs, based on the image data picked up by the camera 11, the image recognition process. The image recognition process performed by each of the control units 14 recognizes pedestrians around a corresponding one of the vehicles V1 to Vm, marker lines painted on a road on which a corresponding one of the vehicles V1 to Vm is travelling, and/or others. In the meanwhile, each of the control units 14 performs various processes, such as a lane-deviation warning process and a lane-deviation prevention process, based on a result of the image recognition process.

In this embodiment, values of the parameters of the image recognition process established to associate with each of the travelable areas A1 to An are previously stored in the memory unit 12 of each of the in-vehicle deices 10. That is, at step S105, each of the control units 14 reads the values of the parameters associated with a current travelable area as one of the travelable areas A1 to An identified at S100, and performs the image recognition process using the values of the parameters.

At step S110, each of the control units 14 treats, as learning data, the image data taken with the camera 11 and used for the image recognition process. At step S110, each of the control units 14 also transmits the learning data and the corresponding environmental data to the learning server system 2 via the wireless communication unit 17, and terminates the learning-data transmission process.

Machine Learning Process

Figure 6:
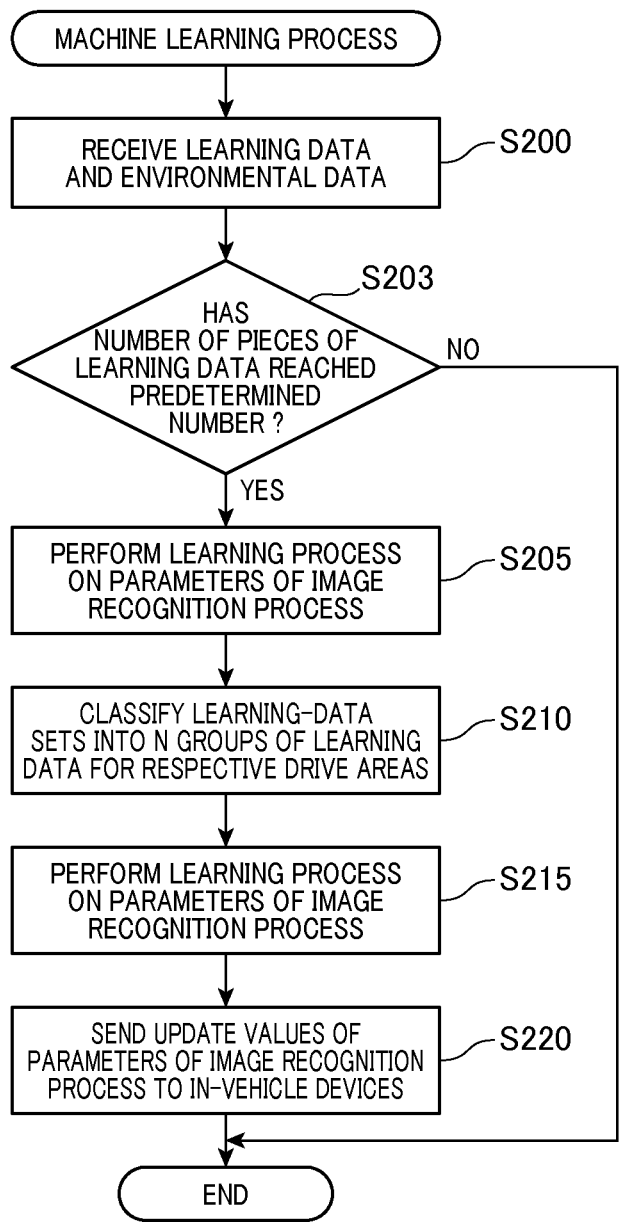
FIG. 6 is a flowchart schematically illustrating an example of a machine learning process carried out by the server system.

A machine learning process of the learning server system 2 is designed to collect the learning data and the environmental data from each of the in-vehicle devices 10 that are installed in the respective vehicles V1 to Vm, and perform a learning process based on many pieces of the learning data collected from all the in-vehicle devices 10. The machine learning process will be described with reference to a flowchart illustrated in FIG. 6.

Note that, for example, the learning server system 2 repeatedly, i.e. cyclically, performs the machine learning process.

At step S200, the control unit 33 of the main learning server 30 receives the learning data and the environmental data sent from each of the in-vehicle devices 10. At step S200, the control unit 33 also stores the learning data and the environmental data for each of the in-vehicle devices 10 in the memory unit 32 such that the learning data correlates with the corresponding environmental data for each of the in-vehicle devices 10.

Note that, as illustrated in FIG. 3, it is assumed that (1) Learning data sent from the in-vehicle device 10 installed in each of the vehicles V1 to Vm will be referred to as learning data $LV_i$ ($1 \le i \le m$)

(2) The environmental data for the travelable area $A_j$ ($1 \le j \le n$) will be referred to as environmental data $D(A_j)$.

That is, the learning data $LV_i$ for each of the in-vehicle devices 10 is stored in the memory unit 32 to correlate with a corresponding one of the environmental data $D(A_1)$ to the environmental data $D(A_n)$.

Next, the control unit 33 determines whether the number of pieces of the learning data $LV_i$ for each of the in-vehicle devices 10 has reached a predetermined number at step S203.

When it is determined that the number of pieces of the learning data $LV_i$ for each of the in-vehicle devices 10 has not reached the predetermined number (NO at step S203), the control unit 33 repeats the determination in step S203.

Otherwise, when it is determined that the number of pieces of the learning data $LV_i$ for each of the in-vehicle devices 10 has reached the predetermined number (YES at step S203), the machine learning process proceeds to step S205. That is, the predetermined number of pieces of the learning data $LV_1$ to the predetermined number of pieces of the learning data $LV_m$ have been stored in the memory unit 32. The predetermined number of pieces of the learning data $LV_i$ will be referred to as a learning-data set $LV_i$ hereinafter.

At step S205, the control unit 33 performs the learning process on the parameters of the image recognition process stored in the memory unit 32 using all the learning-data sets $LV_1$ to $LV_m$ collected from all the in-vehicle devices 10, i.e. from all the vehicles V1 to Vm at S200. Because the in-vehicle devices 10 are respectively installed in the vehicles V1 to Vm, the control unit 33 performs the learning process on the parameters of the image recognition process using all the learning-data sets $LV_1$ to $LV_m$ collected from all the in-vehicle devices 10 at step S200. That is, the learning-data sets $LV_1$ to $LV_m$ are used as input-data sets to the image recognition process for learning the parameters of the image recognition process.

The learning process at step S205 obtains trained values of the parameters of the image recognition process.

At step S205, the control unit 33 can perform, for example, a known unsupervised learning process as the learning process, using, for example, an autoencoder. For example, an autoencoder is unsupervised learning algorithm that applies backpropagation, setting the target values obtained from the output layer to be substantially equal to the inputs to the input layer while the number of nodes of the input layer is equal to the number of nodes of the output layer.

At step S205, the control unit 33 can perform, based on the results of the unsupervised learning process, a known learning process that trains values of the parameters of the image recognition process so as to recognize images in all the input-data sets.

After completion of the learning process at step S205, the trained values of the parameters of the image recognition process have been obtained as the results of the learning process at step S205.

Next, the control unit 33 classifies, based on the environmental data D(A1) to the environmental data D(An), the learning-data sets LV1 to LVm for the respective vehicles V1 to Vm collected at step S200 into n groups G1 to Gn of learning data (see FIG. 7) at step S210.

Specifically, pieces of learning data, which are included in the learning-data sets LV1 to LVm and correlate with the environmental data D(A1), are classified into the group G1 as pieces of learning data LV(A1). Pieces of the learning data included in the learning-data sets LV1 to LVm, which are included in the learning-data sets LV1 to LVm and correlate with the environmental data D(A2), are classified into the group G2 as pieces of learning data LV(A2). Similarly, pieces of the learning data, which are included in the learning-data sets LV1 to LVm and correlate with the environmental data D(An), are classified in the group Gn as pieces of learning data LV(An).

That is, pieces of learning data, which are included in the learning-data sets LV1 to LVm and correlate with the environmental data DA(j), are classified in the group Gj ($1 \leq j \leq n$) as pieces of learning data LV(Aj). The pieces of learning data LV(Aj) classified in the group Gj will be referred to as an environmental learning-data set LV(Aj) hereinafter.

Next, the control unit 33 transmits the environmental learning-data set LV(Aj) classified in the group Gj to the sub learning server 40aj corresponding to the travelable area Aj at step S213. Specifically, at step S213, the environmental learning-data set LV(A1), the environmental learning-data set LV(A2), . . . , and the environmental learning-data set LV(An) are respectively sent to the sub learning server 40a1, the sub learning server 40a2, . . . , and the sub learning server 40an.

At step S213, the control unit 33 also sends, to each of the sub learning servers 40a1 to 40n, the results of the learning process performed at step S205, that is, the trained values of the parameters of the image recognition process obtained by the main learning server 30. Thereafter, the machine learning process proceeds to step S215.

At step S215, the control unit 43 of each of the sub learning servers 40a1 to 40an receives a corresponding one of the environmental learning-data sets LV(A1) to LV(An), and receives the trained values of the parameters of the image recognition process.

Then, at step S215, the control unit 43 of each of the sub learning servers 40a1 to 40an performs the learning process on the parameters of the image recognition process stored in the memory unit 42 using (1) A corresponding one of the received environmental learning-data sets LV(A1) to LV(An)

(2) The trained values of the parameters of the image recognition process sent from the main learning server 30 as an input data set to the learning process.

As a result of the learning process, the control unit 43 of each of the sub learning servers 40a1 to 40an obtains values of the parameters of the image recognition process precisely trained for each of the corresponding drivable areas.

At step S215, the control unit 43 of each of the sub learning servers 40a1 to 40an can perform a known unsupervised learning process as the learning process, as an example, using, for example, an autoencoder as described at step S205. At step S215, the control unit 43 of each of the sub learning servers 40a1 to 40an can perform a known learning process that trains values of the parameters of the image recognition process based on data mining as described at step S205.

Other than the above, the main learning server 30 and each of the sub learning servers 40a1 to 40an can perform the learning process on the parameters of the image recognition process in the following approaches.

In the first approach, the control unit 33 of the main learning server 30 trains an unsupervised routine, i.e. a first routine, included in the image recognition process, in other words, trains parameters of the first routine; the first routine is designed to obtain a feature for each piece of learning data.

For example, a feature of each piece of learning data is information that expresses a corresponding piece of learning data most appropriately. For example, in this embodiment, a feature of each piece of learning data, i.e. image data, represents a linear combination of pixel values of a corresponding piece of image data with weight parameters.

For example, it is assumed that (1) Many pieces of image data are referred to as image data IDk (k=1, 2, . . . )

(2) Pixel values of the pieces of each image data IDk are referred to as Dk(x, y: x=1, 2, . . . , X; y=1, 2, . . . , Y)

(3) Weight parameters provided for the respective pixels of each image data IDk are referred to as θ(x, y).

In this assumption, for example, the linear combination of the pixel values Dk(x, y) of the image data IDk with the weight parameters θ(x, y) provides the following feature:

$$\sum_{x=1,\ldots,X, y=1,\ldots,Y} (Dk(x, y)\theta(x, y)) =$$
$$(Dk(1, 1)\theta(1, 1) + Dk(2, 1)\theta(2, 1) + \ldots +$$
$$Dk(1, 2)\theta(1, 2) + Dk(2, 2)\theta(2, 2) + \ldots )$$

Note that the sigma equation is used for the linear combination of the pixel values Dk(x, y) of the image data IDk with the weight parameters θ(x, y). In order to perform the non-linear combination of the pixel values Dk(x, y) of the image data IDk with the weight parameters θ(x, y), a sigmoid function f(x)=σy(x) should be applied to the results of the linear combination.

That is, the control unit 33 of the main learning server 30 trains, as the parameters of the first routine included in the image recognition process, values of the weight parameters of the linear combination of the pixel values of each image data at step S205. The training obtains trained values of the weight parameters of the linear or non-linear combination of the pixel values of each image data collected from the in-vehicle devices 10 such that the feature of each image data is, for example, most sharpened as the results of the learning process at step S205.

Then, the control unit 33 transmits, to each of the sub learning servers 40a1 to 40an, the trained values of the weighting parameters of the linear or non-linear combination of the pixel values of each image data collected from the in-vehicle devices 10 at step S213. At step S213, as described above, the control unit 33 transmits the environmental learning-data set LV(Aj) classified in the group Gj at step S210 to the sub learning server 40aj corresponding to the travelable area Aj.

The control unit 43 of each of the sub learning servers 40a1 to 40an receives a corresponding one of the environmental learning-data sets LV(A1) to LV(An), and receives the trained values of the weight parameters of the linear combination at step S215.

Then, at step S215, the control unit 43 of each of the sub learning servers 40a1 to 40an prepares several pieces of training data, from a corresponding one of the environmental learning-data sets LV(A1) to LV(An). The training data is comprised of: pieces of input image data; and desired pieces of output data, i.e. supervised data, respectively correspond to the pieces of input image data. For example, the desired pieces of output data include, as labels for the pieces of input image data, the position of at least one lane marker or information indicative of whether at least one pedestrian exists.

Note that manual works are required to create the several pieces of training data, so that the several pieces of training data for each of the sub learning servers 40a1 to 40an are created by, for example, an operator that operates a corresponding one of the sub learning servers 40a1 to 40an. Therefore, it may be difficult to prepare many pieces of training data for each of the sub learning servers 40a1 to 40an.

The control unit 43 of each of the sub learning servers 40a1 to 40an performs the learning process on the parameters of the image recognition process stored in the memory unit 42 using 1. A corresponding one of the received environmental learning-data sets LV(A1) to LV(An)
2. The trained values of the weight parameters of the image recognition process sent from the main learning server 30 as an input data set to the learning process
3. The several pieces of training data for a corresponding one of the sub learning servers 40a1 to 40an.

Specifically, the control unit 43 of each of the sub learning servers 40a1 to 40an calculates results of the linear combination using (1) The weighting parameters whose values are fixed to the trained values of the weight parameters of linear combination sent from the main learning server 30
(2) A corresponding one of the received environmental learning-data sets LV(A1) to LV(An).

This achieves the results of the liner combination as input data to a supervised routine, i.e. a second routine, included in the image recognition process.

Thereafter, the control unit 43 of each of the sub learning servers 40a1 to 40an trains parameters of the second routine using the input data to the second routine; the second routine is comprised of, for example, the SVM.

The control unit 43 of each of the sub learning servers 40a1 to 40an can be configured to perform a supervised learning process on the parameters of the image recognition process using the trained values of the parameters of the image recognition obtained by an unsupervised learning process of the main learning server 30.

For example, the control unit 33 performs a known unsupervised learning process as the learning process using the autoencoder set forth above, thus obtaining trained values of the weight parameters of the linear combination set forth above.

Then, the control unit 43 of each of the sub learning servers 40a1 to 40an trains the weight parameters of the linear combination using, as initial values of the weight parameters, the trained values of the weight parameters of the linear combination sent from the main learning server 30. For example, the control unit 43 of each of the sub learning servers 40a1 to 40an makes fine adjustments, i.e. fine tuning, of the weight parameters using, for example, the same autoencoder as a known method and algorithm of supervised learning.

That is, the main learning server 30 according to this embodiment collectively performs the learning process from many pieces of the learning data, i.e. image data, sent from each of the in-vehicle devices 10 without separating the many pieces of the learning data from one another according to their corresponding travelable areas. This obtains generic trained values of the parameters of the image recognition process.

Thereafter, the main learning server 30 sends the generic trained values of the parameters of the image recognition process to each of the sub learning servers 40a1 to 40an.

In addition, the main learning server 30 categorizes the many pieces of the learning data, i.e. image data, sent from each of the in-vehicle devices 10 into plural groups G1 to Gn of learning data respectively matching with corresponding travelable areas A1 to An. Then, the main learning server 30 sends the groups G1 to Gn of learning data to the respective sub learning servers 40a1 to 40an.

Each of the sub learning servers 40a1 to 40an trains, i.e. makes fine adjustments of, the parameters of the image recognition process using (1) The trained values of the parameters of the image recognition process sent from the main learning server 30
(2) A corresponding one of the groups G1 to Gn of learning data matching with a corresponding one of the travelable areas A1 to An.

That is, the trained values of the parameters of the image recognition process obtained by each of the sub learning servers 40a1 to 40an matches with a corresponding one of the travelable areas A1 to An. The trained value of the parameters of the image recognition process obtained by the sub learning server 40aj (j=1, . . . , n) will be referred to as trained values LVj of the parameters of the image recognition process matching which the corresponding travelable area Aj.

Following the operation at step S215, the control unit 43 of each sub learning server 40aj sends the trained values LVj of the parameters of the image recognition process matching with the corresponding travelable area Aj to the main learning server 30 at step S220.

At step S220, the control unit 33 of the main learning server 30 receives the trained values LVj of the parameters of the image recognition process matching with the corresponding travelable area Aj. Then, the control unit 33 of the main learning server 30 recognizes the trained values LVj of the parameters of the image recognition process sent from each sub learning server 40aj as update values UVj of the parameters of the image recognition process matching with the corresponding travelable area Aj.

At step S230, the control unit 33 of the main learning server 30 sends the update values UVj of the parameters of the image recognition process matching with the corresponding travelable area Aj to at least one in-vehicle device in the in-vehicle devices 10; the at least one in-vehicle device is located in the corresponding travelable area Aj. After the operation at step S230, the learning server system 2 terminates the machine learning process.

Updating Process

Next, an updating process executed by each of the in-vehicle devices 10 will be described hereinafter. The updating process installed in each of the in-vehicle devices 10 is designed to (1) Receive the update values UVj of the parameters of the image recognition process matching with the corresponding travelable area Aj when a corresponding one of the in-vehicle devices 10 is located in the corresponding travelable area Aj (2) Update the current values of the parameters of the image recognition process stored in the memory unit 12 to the update values UVj of the parameters of the image recognition process.

Figure 7:
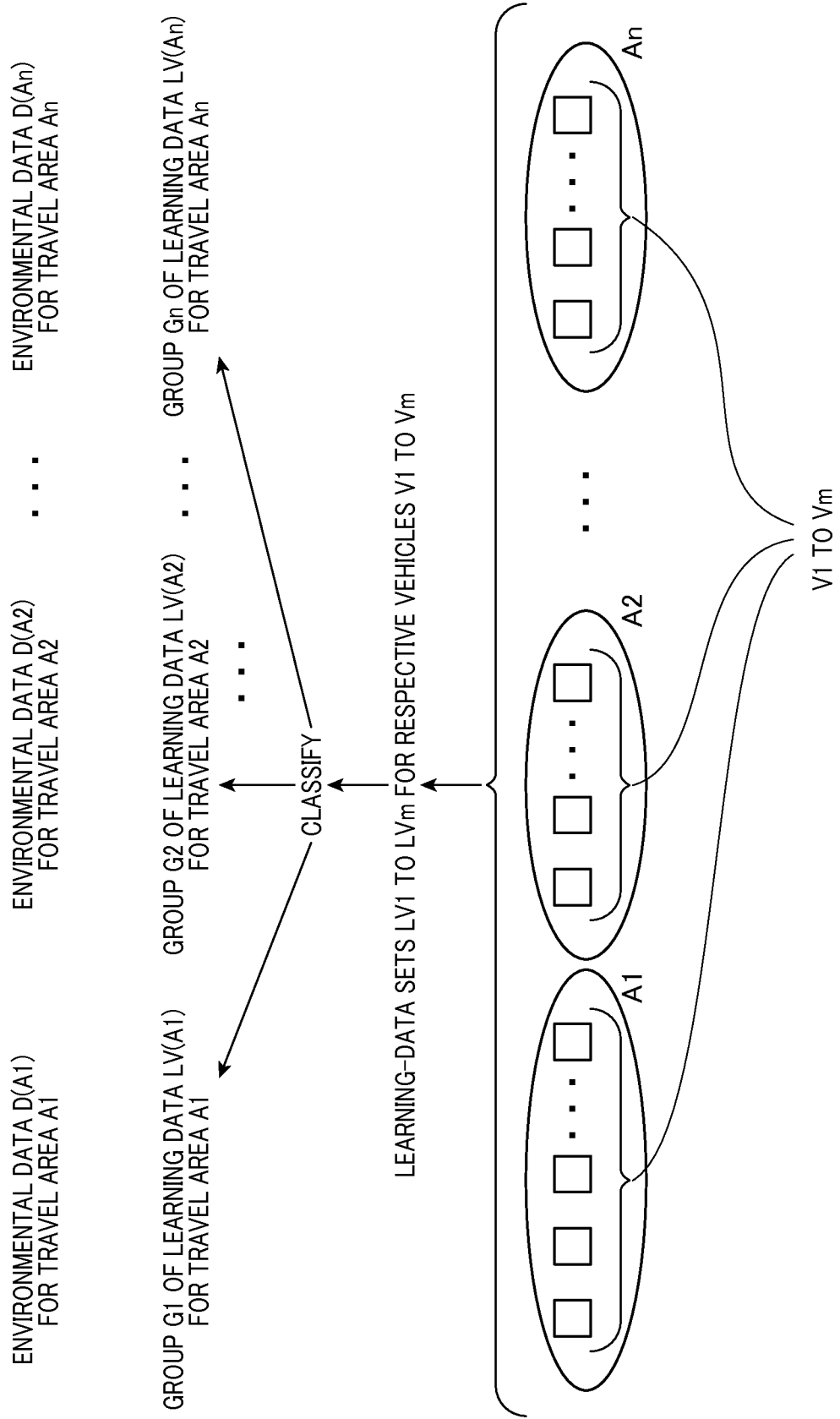
FIG. 7 is a view schematically illustrating the operation at step S210 illustrated in FIG. 6.

The updating process executed by each of the in-vehicle devices 10 will be described hereinafter with reference to a flowchart illustrated in FIG. 7. Note that each of the in-vehicle devices 10 repeatedly, i.e. cyclically, performs the updating process.

At step S300, the control unit 14 of each of the in-vehicle devices 10 determines whether the update values UVj of the parameters of the image recognition process matching with the corresponding travelable area Aj have been sent from the main learning server 30.

For example, when an in-vehicle device 10(1) is located in the travelable area A1, the control unit 14 of the in-vehicle device 10(1) determines that the update values UV1 of the parameters of the image recognition process have been sent from the main learning server 30 (YES at step S300). Then, at step S302, the control unit 14 of the in-vehicle device 10(1) receives the update values UV1 of the parameters of the image recognition process from the main learning server 30. That is, when at least one of the in-vehicle devices 10 is located in the travelable area Aj, the control unit 14 of the at least one of the in-vehicle devices 10 determines that the update values UVj of the parameters of the image recognition process have been sent from the main learning server 30 (YES at step S300). Then, the control unit 14 of the at least one of the in-vehicle devices 10 receives the update values UVj of the parameters of the image recognition process having been sent from the main learning server 30 at step S302.

Otherwise, the in-vehicle devices 10 are not located in the travelable area Aj, the control unit 14 of each of the in-vehicle devices 10 determines that the update values UVj of the parameters of the image recognition process have not been sent from the main learning server 30 (NO at step S300). Then, the control unit 14 of each of the in-vehicle devices 10 terminates the updating process.

Following the operation at step S302, the control unit 14 of the at least one of the in-vehicle devices 10 updates the current values of the parameters of the image recognition process stored in the memory unit 12 to the received update values UVj of the parameters of the image recognition process at step S305. Thereafter, the control unit 14 of the at least one of the in-vehicle devices 10 terminates the updating process.

Effects

According to the learning system 1 according to this embodiment, each of the in-vehicle devices 10 is configured not to perform the learning process to train values of the parameters of the image recognition process, and to receive the trained values of the parameters of the image recognition process sent from the learning server system 2. That is, the learning server system 2 is configured to perform the learning process to train values of the parameters of the image recognition process, and provide the trained values of the parameters of the image recognition process to each of the in-vehicle devices 10. When receiving the trained values of the parameters of the image recognition process, each of the in-vehicle devices 10 receives the trained values of the parameters of the image recognition process, and updates the current values of the parameters of the image recognition process stored in the memory unit 12.

Thus, each of the in-vehicle devices 10 improves the image recognition process without performing the learning process by the corresponding device itself. Each of the in-vehicle devices 10 is capable of improving the image recognition process after shipment of the corresponding device without improving hardware performance of the corresponding in-vehicle device 10.

To the learning server system 2 of the learning system 1, many pieces of learning data are sent from many in-vehicle devices 10, so that the many pieces of learning data are stored in the learning server system 2. This makes it possible for the learning system 1 to efficiently perform machine learning in a shorter time as compared with a case where each of the in-vehicle devices 10 performs machine learning based on learning data obtained thereby.

The traffic environments of the respective travelable areas A1 to An are different from one another. For example, the traffic environments of a warm region and those of a snowy region are much different from each other, so that proper values of the parameters of the image recognition process in such a warm region are considered to be different from those of the parameters of the image recognition process in such a snowy region.

In view of the circumstances, according to the learning system 1 according to this embodiment, each of the in-vehicle devices 10 transmits, to the learning server system 2, the learning data and the environmental data matching with a current travelable area in one of the travelable areas A1 to An. The main learning server 30 of the learning server system 2 trains values of the parameters of the image recognition process using many pieces of learning data collected from all in-vehicle devices 10 to obtain generic trained values of the parameters of the image recognition process. Then, the main learning server 30 separates the many pieces of learning data into groups of learning data; each of the groups of learning data matches with a corresponding one of the travelable areas A1 to An. The main learning server 30 sends, to each of the sub learning servers 40a1 to 40an, the generic trained values of the parameters of the image recognition process and a corresponding one of the groups of learning data.

This makes it possible for each of the sub learning servers 40a1 to 40an to perform the learning process to train, i.e. make fine adjustments of, current values of the parameters of the image recognition process using (1) The generic trained values of the parameters of the image recognition process (2) A corresponding one of the groups of learning data matching with a corresponding travelable area.

This results in optimization of the image recognition process of each of the in-vehicle devices 10 according to the traffic environments of the travelable area in which a corresponding one of the in-vehicle devices 10 is located. This therefore further improves the image recognition process installed in each of the in-vehicle devices 10.

Modifications

The learning system 1 according to this embodiment is configured to perform the machine learning process for training the parameters of the image recognition process, but the present disclosure is not limited thereto. Specifically, the learning system 1 can be configured to perform the machine learning process for training another process, such as a sound recognition process.

The machine learning process carried out by the learning server system 2 is designed to train values of the parameters of the image recognition process based on pieces of learning data, i.e. image data, obtained by the in-vehicle devices 10, but the present disclosure is not limited thereto. Specifically, the machine learning process carried out by the learning server system 2 can be designed to train at least one factor, i.e. a variable section, defining the image recognition process, such as an algorithm of the image recognition process. That is, one or more factors, such as one or more parameters, and a corresponding algorithm, defining, i.e. specifying, the image recognition process or another process can be trained by the machine learning process.

In this modification, the machine learning process carried out by the learning server system 2 is designed to train the algorithm of the image recognition process based on pieces of learning data, i.e. image data. Then, the learning server system 2 is designed to send the trained algorithm of the image recognition process to each of the in-vehicle devices 10. When receiving the trained algorithm of the image recognition process, each of the in-vehicle devices 10 is configured to perform the image recognition process based on the trained algorithm thereafter. The learning system according to this modification can achieve substantially the same effects as those achieved by the learning system 1.

The main learning server 30 is configured to perform a known unsupervised learning process as the learning process in step S205, and each of the sub learning servers 40a1 to 40an is also configured to perform a known unsupervised learning process as the learning process in step S215, but the present disclosure is not limited thereto. Specifically, the main learning server 30 and each of the sub learning servers 40a1 to 40an can be configured to perform a known supervised learning process as the learning process in respective steps S205 and S215. The learning system according to this modification can achieve substantially the same effects as those achieved by the learning system 1.

Specifically, in order to perform a supervised learning process, it is necessary to manually prepare several pieces of training data; the training data is comprised of: pieces of input image data (learning data); and desired pieces of output data, i.e. supervised data, respectively correspond to the pieces of input image data. The learning system according to this modification can achieve substantially the same effects as those achieved by the learning system 1.

In the learning system 1 according to this embodiment, each of the control units 14 transmits the learning data and the corresponding environmental data to the learning server system 2 via the wireless communication unit 17. The environmental data for each of the travelable areas A1 to An includes environmental information about a corresponding one of the travelable areas A1 to An.

The main learning server 30 trains values of the parameters of the image recognition process using many pieces of learning data collected from all in-vehicle devices 10 to obtain generic trained values of the parameters of the image recognition process.

Then, the main learning server 30 separates the many pieces of learning data into groups of learning data; each of the groups of learning data matches with a corresponding one of the travelable areas A1 to An. The main learning server 30 sends, to each of the sub learning servers 40a1 to 40an, the generic trained values of the parameters of the image recognition process and a corresponding one of the groups of learning data.

Each of the sub learning servers 40a1 to 40an performs the learning process to train, i.e. make fine adjustments of, current values of the parameters of the image recognition process using (1) The generic trained values of the parameters of the image recognition process as initial values of the parameters (2) A corresponding one of the groups of learning data matching with a corresponding travelable area.

However, the present disclosure is not limited to this configuration.

Specifically, each of the in-vehicle devices 10 according to a first modification can transmit the learning data and environmental data to the learning server system 2 via the wireless communication unit 17 in step S110. The environmental data sent from each of the in-vehicle deices 10 can include environmental information during a corresponding vehicle driving, such as a weather condition, a time period, and/or a season during a corresponding vehicle driving. The environmental data can be measured by one or more sensors installed in each of the vehicles V1 to Vm.

The main learning server 30 according to the first modification can train values of the parameters of the image recognition process using many pieces of learning data collected from all in-vehicle devices 10 to obtain generic trained values of the parameters of the image recognition process in steps S200 and S205.

Then, the main learning server 30 according to the first modification can separate the many pieces of learning data into groups of learning data according to pieces of the environmental information respectively corresponding to the many pieces of learning data in step S210. Thus, each of the sub learning servers 40a1 to 40an according to the first modification can perform, in step S215, the learning process to train, i.e. make fine adjustments of, current values of the parameters of the image recognition process using (1) The generic trained values of the parameters of the image recognition process as initial values of the parameters (2) A corresponding one of the groups of learning data.

In addition, each of the in-vehicle devices 10 according to a second modification can transmit the learning data and environmental data to the learning server system 2 via the wireless communication unit 17 in step S110. The environmental data sent from each of the in-vehicle deices 10 can include environmental information about a corresponding vehicle including at least one of 1. The type of a corresponding vehicle 2. The conditions of a corresponding vehicle, such as the vehicle speed and the steering angle, when the learning data, i.e. image data, is obtained.

The former information of the environmental data can be for example stored in the memory unit 12 of each of the in-vehicle devices 10, and the latter information can be for example measured by the one or more sensors installed in each of the vehicles V1 to Vm.

The main learning server 30 according to the second modification can train values of the parameters of the image recognition process using many pieces of learning data collected from all in-vehicle devices 10 to obtain generic trained values of the parameters of the image recognition process in steps S200 and S205.

Then, the main learning server 30 according to the second modification can separate the many pieces of learning data into groups of learning data according to pieces of the environmental information respectively corresponding to the many pieces of learning data in step S210. For example, each of the groups of learning data matches with a corresponding one of the types of the vehicles V1 to Vm, or each of the groups of learning data matches with a corresponding one of the conditions of the vehicles V1 to Vm.

Thus, each of the sub learning servers 40a1 to 40an can perform, in step S215, the learning process to train, i.e. make fine adjustments of, current values of the parameters of the image recognition process using (1) The generic trained values of the parameters of the image recognition process as initial values of the parameters (2) A corresponding one of the groups of learning data.

The learning systems according to these first and second modifications can achieve substantially the same effects as those achieved by the learning system 1.

The learning server system 2 of the learning system 1 according to this embodiment has a two-level hierarchical structure comprised of the main learning server 30 and the sub learning servers 40a1 to 40an, but can have three or more-level hierarchical structure.

For example, the learning server system 2 according to a third modification has a three-level hierarchical structure. The learning server system 2 is comprised of 1. The main learning server 30 located at the highest level
2. A plurality of first sub learning servers 40a1 to 40an located lower in level than the main learning server 30
3. A plurality of second sub learning servers 50a1 to 50ax (see phantom lines in FIG. 3) provided for each of the first sub learning servers 40a1 to 40an and located lower in level than each of the first sub learning servers 40a1 to 40an.

The plurality of first sub learning servers 40a1 to 40an are provided to respectively cover the plurality of travelable areas A1 to An for the vehicles V1 to Vm in which the corresponding in-vehicle devices 10 are installed. Each of the travelable areas A1 to An is divided into a plurality of sub travelable areas. The plurality of second sub learning servers are provided to respectively cover the plurality of sub-travelable areas for each of the first sub learning servers 40a1 to 40an.

Like this embodiment, the main learning server 30 trains values of the parameters of the image recognition process using many pieces of learning data collected from all in-vehicle devices 10 to obtain generic trained values of the parameters of the image recognition process (see steps S200 and S205).

Then, the main learning server 30 separates the many pieces of learning data into groups of learning data; each of the groups of learning data matches with a corresponding one of the drive areas A1 to An. The main learning server 30 sends, to each of the first sub learning servers 40a1 to 40an, the generic trained values of the parameters of the image recognition process and a corresponding one of the groups of learning data (see step S210).

Each of the first sub learning servers 40a1 to 40an performs the learning process to train, i.e. make fine adjustments of, current values of the parameters of the image recognition process using (1) The generic trained values of the parameters of the image recognition process as initial values of the parameters (2) A corresponding one of the groups of learning data matching with a corresponding travelable area (see step S215).

Then, each of the first sub learning servers 40a1 to 40an separates a corresponding one of the groups of learning data into sub groups of learning data; each of the sub groups of learning data matches with a corresponding one of the sub areas (see step S210). Each of the first sub learning servers 40a1 to 40an sends, to each of the second sub learning servers 50a1 to 50ax provided therefor, the trained values of the parameters of the image recognition process and a corresponding one of the sub groups of learning data (see step S210).

Each of the second sub learning servers 50a1 to 50ax performs the learning process to train, i.e. make fine adjustments of, current values of the parameters of the image recognition process using (1) The trained values of the parameters of the image recognition process as initial values of the parameters (2) A corresponding one of the sub groups of learning data matching with a corresponding sub travelable area (see step S215).

Each of the second sub learning servers 50a1 to 50ax provided for each of the first sub learning servers 40a1 to 40an sends the trained values of the parameters of the image recognition process matching with a corresponding one of the sub travelable areas to the main learning server 30 (see step S220).

The main learning server 2 recognizes the trained values of the parameters of the image recognition process sent from each second sub learning server as update values of the parameters of the image recognition process matching with a corresponding one of the sub travelable area. Then, the main learning server 30 sends the update values of the parameters of the image recognition process matching with a corresponding one of the sub areas to at least one in-vehicle device in the in-vehicle devices 10; the at least one in-vehicle device is located in a corresponding one of the sub areas.

When an in-vehicle device 10(1) is located in one of the sub areas, the in-vehicle device 10(1) receives the update values of the parameters of the image recognition process. Then, the in-vehicle device 10(1) updates the current values of the parameters of the image recognition process stored in the memory unit 12 to the received update values of the parameters of the image recognition process (see steps S300 to S305); these update values of the parameters are suitable for a corresponding one of the sub areas. Then, the in-vehicle device 10(1) is capable of performing the image recognition process using the update values of the parameters suitable for a corresponding one of the sub drive areas in which the corresponding vehicle is travelling.

The above configuration of the learning system according to the third modification makes it possible for each of the in-vehicle devices 10 to perform the image recognition process more appropriately based on a corresponding one of the sub travelable areas in which the corresponding vehicle is travelling.

The learning system according to this embodiment is comprised of the main learning server 30, and the sub learning servers 40a1 to 40an. However, the present disclosure is not limited to the structure. Specifically, a single server can construct the learning system, and the single server can include a first module functionally matching with the main learning server 30, and second modules functionally matching with the respective sub learning servers 40a1 to 40an. The learning server according to this modification can achieve substantially the same effects as those achieved by the learning system 1.

The sub learning servers 40a1 to 40an according to this embodiment are provided to cover the respective travelable areas A1 to An, but the present disclosure is not limited thereto. Specifically, an overall region in which the vehicles V1 to Vm can travel are divided into a plurality of regions. Among the plurality of regions, some regions whose characteristics are substantially common to each other are collected to a single travelable area, so that a plurality of travelable areas are obtained. For example, several heavy-snow regions in the plurality of regions are collected to a single travelable area, and several regions having similar high average temperatures in the plurality of regions are collected to a single travelable area. A plurality of sub learning servers 40 can be provided for the respective travelable areas.

In this modification, like this embodiment, the main learning server 30 trains values of the parameters of the image recognition process using many pieces of learning data collected from all in-vehicle devices 10 to obtain generic trained values of the parameters of the image recognition process. Then, the main learning server 30 separates the many pieces of learning data into groups of learning data; each of the groups of learning data matches with a corresponding one of the travelable areas. Each of the sub learning servers performs the learning process to train, i.e. make fine adjustments of, current values of the parameters of the image recognition process using (1) The generic trained values of the parameters of the image recognition process as initial values of the parameters (2) A corresponding one of the groups of learning data matching with a corresponding travelable area.

Thus, the learning system according to this modification can achieve substantially the same effects as those achieved by the learning system 1.

The main learning server 30 according to this embodiment is configured to

1. Train values of the parameters of the image recognition process using many pieces of learning data collected from all in-vehicle devices 10 to obtain generic trained values of the parameters of the image recognition process 2. Separate the many pieces of learning data into groups of learning data; each of the groups of learning data matches with a corresponding one of the travelable areas A1 to An 3. Send, to each of the sub learning servers 40a1 to 40an, the generic trained values of the parameters of the image recognition process and a corresponding one of the groups of learning data.

The present disclosure is not limited to this configuration.

Specifically, the main learning server 30 according to a modification can be configured to 1. Separate pieces of learning data collected from all in-vehicle devices 10 into groups of learning data when receiving them from all in-vehicle devices 10; each of the groups of learning data matches with a corresponding one of the travelable areas A1 to An 2. Send, to each of the sub learning servers 40a1 to 40an, a corresponding one of the groups of learning data so that a corresponding one of the groups of learning data is stored in each of the sub learning servers 40a1 to 40an.

3. When the number of pieces of learning data of each group has reached a predetermined number, collect the pieces of learning data of each group from a corresponding one of the sub learning servers 40a1 to 40an 4. Train values of the parameters of the image recognition process using the pieces of learning data of each group collected from a corresponding one of the sub learning servers 40a1 to 40an to obtain generic trained values of the parameters of the image recognition process.

A learning system (for example, 1) according to a specific example of the present disclosure includes (1) At least one device (for example, 10) installed in a vehicle (for example, V)

(2) A server system (for example, 2) communicably coupled to the at least one device (for example, 10).

The at least one device includes a performing unit (for example, S105), i.e. a performing means, for performing a predetermined process associated with the vehicle using data. The at least one device includes a sending unit (for example, S110), i.e. a sending means, for sending, to the server system (2), the data used by the performing unit as learning data.

The server system (2) includes an obtaining unit (for example, S200), i.e. an obtaining means, for obtaining the learning data sent from the at least one device (10). The server system (2) includes a performing unit (for example, S205 and S215), i.e. a performing means, for performing a learning process on at least a factor, i.e. a variable section, defining the predetermined process using the obtained learning data to generate update data for updating at least the factor defining the predetermined process. The server system (2) includes a sending unit (for example, S220), i.e. a sending means, for sending the update data to the at least one device (10).

The at least one device (10) further includes an updating unit (for example, S300, S302, and S305), i.e. an updating means, for updating at least the factor defining the predetermined process based on the update data sent from the server system (2).

In the learning system (1), the vehicle is comprised of a plurality of vehicles (V1 to Vm) different from each other, and the at least one device (10) is comprised of a plurality of devices (10) installed in the respective vehicles (V1 to Vm). Each of the devices (10) further includes an obtaining unit (for example, S100), i.e. an obtaining means, for obtaining a piece of environmental data associated with at least one of: an environment of a periphery of a corresponding one of the vehicles, and an environment of a corresponding one of the vehicles itself. The performing unit (S105) of each of the devices (10) performs the predetermined process associated with a corresponding one of the vehicles using the data and the corresponding piece of environmental data. The sending unit (S110) of each of the devices (10) sends, to the server system (2), a piece of the learning data and the corresponding piece of environmental data.

The obtaining unit (S200) of the server system (2) obtains the learning data and the piece of environmental data sent from each of the devices (2). The server system (2) further includes a categorizing unit (for example, step S210), i.e. a categorizing means, for categorizing the pieces of the learning data sent from all the devices (10) into a plurality of groups of learning data according to the pieces of the environmental data sent from the respective devices (10). The performing unit (S205 and S215) of the server system (2) performs the learning process on at least the factor defining the predetermined process using the plurality of groups of learning data to generate pieces of the update data for the respective groups of learning data for updating at least the factor defining the predetermined process. The updating unit (S300, S302, and S305) of each of the devices (10) updates at least the variable element of the predetermined process based on a corresponding one of the pieces of the update data. A corresponding one of the pieces of the update data matches with the piece of the environmental data sent from a corresponding one of the devices (10).

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A learning system comprising:
   a plurality of devices, each of the plurality of devices being installed in a corresponding vehicle of a plurality of vehicles; and
   a server system communicably coupled to each of the devices,
   each of the devices includes a first control unit having a first microcomputer, the first microcomputer executing code to
      perform an image process associated with vehicle data, the image process including at least first and second nodes and a connection weight parameter between the first and second nodes, the vehicle data being sensed at the corresponding vehicle; and
      send, to the server system, as learning data, the vehicle data which is sensed at the corresponding vehicle and is used by the image process,
   the server system includes a second control unit executing code to
      obtain the learning data sent from each of the devices;
      perform a learning process on at least the connection weight parameter of the image process using the obtained learning data to generate update data for updating at least the connection weight parameter; and
      send the update data to each of the devices,
   the first microcomputer of each of the devices further executes code to update at least the image process which is performed by the corresponding device based on the update data sent from the server system,
   the first microcomputer of each of the devices further executes code to
      obtain a piece of environmental data associated with an area in which the corresponding vehicle is travelling;
      perform the image process associated with the corresponding vehicle using the vehicle data of the corresponding vehicle and the corresponding piece of the environmental data; and
      send, to the server system, a piece of the learning data and the corresponding piece of the environmental data associated with the piece of the learning data;
   the second control unit of the server system further executes code to
      obtain the piece of the learning data and the piece of the environmental data sent from each of the devices;
      categorize the pieces of the learning data sent from all of the devices into a plurality of groups of learning data for respective travelable areas, each of the plurality of groups of learning data corresponding to one of the travelable areas being sent from at least one of the devices located in the one of the travelable areas;
      perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and
      send the piece of the update data for each of the groups of learning data to a corresponding one of the devices; and
   the first microcomputer of each of the devices further executes code to update the image process based on the piece of the update data, the piece of the update data matching with the piece of the environmental data obtained by the corresponding device.

2. The learning system according to claim 1, wherein:
   the second control unit comprises:
   a main server; and
   a plurality of sub servers communicable with the main server,
   the main server executes code to
      obtain the learning data and the piece of environmental data sent from each of the devices;
      perform a main learning process as the learning process on at least the connection weight parameter of the image process using the pieces of the learning data sent from all of the devices to generate a first piece of the update data to update the image process which is performed by each of the devices;
      categorize the pieces of the learning data sent from all of the devices into a plurality of groups of learning data for respective travelable areas, each of the plurality of groups of learning data corresponding to one of the travelable areas being sent from the at least one of the devices located in the one of the travelable areas;
      send the groups of learning data to the respective sub servers and send the first piece of the update data to each of the sub servers; and
   each of the sub servers executes code to
      perform, for each of the groups of learning data, a sub learning process as the learning process on at least the connection weight parameter of the image process using the corresponding group of learning data and the first piece of the update data while considering a traffic environment of the corresponding travelable area to which the corresponding group of learning data belongs to generate a piece of the update data for the corresponding group of learning data to update the image process; and
      send the piece of the update data for each of the groups of learning data to the corresponding one of the devices; and
   the first microcomputer of each of the devices further executes code to update the image process based on the piece of the update data,
      the piece of the update data matching with the piece of the environmental data obtained by the corresponding one of the devices.

3. The learning system according to claim 1, wherein
   the update data generated by the server system defines a trained algorithm of the image process,
   the first microcomputer of each of the devices updates the image process based on the trained algorithm to perform the updated image process.

4. The learning system according to claim 1, wherein
the update data generated by the server system defines trained connection weight parameters of the image process,
the first microcomputer of each of the devices updates the connection weight parameter of the image process based on the trained connection weight parameters to perform the image process based on the updated connection weight parameters.

5. The learning system according to claim 1, wherein
each of the devices is an image recognition device and includes at least one of (i) a camera and (ii) one or more sensors,
the image process performed by each of the devices is an image recognition process,
the vehicle data includes data acquired by the at least one of the camera and one or more sensors,
the connection weight parameter which is updated based on update data defines a function of the image recognition process performed by each of the devices.

6. A device system comprising:
a plurality of devices, each of the plurality of devices being installed in a corresponding vehicle of a plurality of vehicles, each of the devices comprising:
a first control unit having a first microcomputer, the first microcomputer executing code to
perform an image process associated with vehicle data, the image process including at least first and second nodes and a connection weight parameter between the first and second nodes, the vehicle data being sensed at the corresponding vehicle;
send to a server system, as learning data, the vehicle data which is sensed at the corresponding vehicle and is used by the image process;
when update data for updating at least the connection weight parameter is sent from the server system as a result of a learning process performed by the server system, receive the update data; and
update at least the image process based on the update data received from the server system,
the first microcomputer of each of the devices further executes code to
obtain a piece of environmental data associated with an area in which the corresponding vehicle is travelling;
perform the image process associated with the corresponding vehicle using the vehicle data of the corresponding vehicle and the corresponding piece of the environmental data;
send, to the server system, a piece of the learning data and the corresponding piece of the environmental data;
the server system includes a second control unit;
the second control unit of the server system executes code to
obtain the piece of the learning data and the piece of the environmental data sent from the device installed in each of the vehicles;
categorize the pieces of the learning data sent from all of the devices into a plurality of groups of learning data for respective travelable areas, each of the plurality of groups of learning data corresponding to one of the travelable areas being sent from at least one of the devices located in the one of the travelable areas;
perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and
send the piece of the update data for each of the groups of learning data to a corresponding one of the devices; and
the first microcomputer of the each of the devices further executes code to update the image process based on the piece of the update data, a corresponding one of the piece of the update data matching with the piece of the environmental data obtained by the device.

7. The device according to claim 6, wherein
the update data generated by the server system defines a trained algorithm of the image process,
the first microcomputer of each of the devices updates the image process based on the trained algorithm to perform the updated image process.

8. The device according to claim 6, wherein
the update data generated by the server system defines trained connection weight parameters of the image process,
the first microcomputer of each of the devices updates the connection weight parameter of the image process to perform the image process based on the updated connection weight parameters.

9. The device according to claim 6, wherein each of the devices is an image recognition device,
each of the devices further includes at least one of (i) a camera and (ii) one or more sensors,
the image process performed by each of the devices is an image recognition process,
the vehicle data includes data acquired by the at least one of the camera and one or more sensors,
the connection weight parameter which is updated based on update data defines a function of the image recognition process performed by each of the devices.

10. A server system comprising:
a control unit having a microcomputer, the microcomputer executing code to
obtain a piece of learning data sent from each of a plurality of devices, each of the plurality of devices being installed in a corresponding vehicle of a plurality of vehicles, the learning data sent from each of the devices being data which is sensed at the corresponding vehicle and is used by the corresponding device during execution of an image process associated with the corresponding vehicle, the image process including at least first and second nodes and a connection weight parameter between the first and second nodes;
perform a learning process on at least the connection weight parameter of the image process using the obtained learning data to generate update data for updating at least the connection weight parameter; and
send the update data to each of the devices,
wherein:
when the learning data is sent from each of the vehicles, the control unit further executes code to
obtain the piece of the learning data and a piece of environmental data sent from each of the devices, the piece of the environmental data being associated with an area in which the corresponding vehicle is travelling;

categorize the pieces of the learning data sent from all of the devices into a plurality of groups of learning data for respective travelable areas, each of the plurality of groups of learning data corresponding to one of the travelable areas being sent from at least one of the devices located in the one of the travelable areas;

perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and send the piece of the update data for each of the groups of learning data to a corresponding one of the devices.

11. The server system according to claim 10, wherein:
the control unit comprises:
a main server; and
a plurality of sub servers communicable with the main server,
the main server executes code to
obtain the learning data and the piece of the environmental data sent from each of the devices, the piece of the environmental data further being associated with at least one of: an environment of a periphery of the corresponding vehicle, and an environment of the corresponding vehicle itself;

perform a main learning process as the learning process on at least the connection weight parameter of the image process using the pieces of the learning data sent from all of the devices to generate a first piece of the update data to update the image process;

categorize the pieces of the learning data sent from all of the devices into the plurality of groups of learning data for the respective travelable areas, each of the plurality of groups of learning data corresponding to one of the travelable areas being sent from the at least one of the devices located in the one of the travelable areas; and send the groups of learning data to the respective sub servers and send the first piece of the update data to each of the sub servers; and each of the sub servers executes code to
perform, for each of the groups of learning data, a sub learning process as the learning process on at least the connection weight parameter of the image process using the corresponding group of learning data and the first piece of the update data to generate the piece of the update data for the corresponding group of learning data while considering a traffic environment of the corresponding travelable area to which the corresponding group of learning data belongs to update the image process; and send the piece of the update data for each of the groups of learning data to the corresponding one of the devices.

12. The server system according to claim 10, wherein the update data generated by the server system defines a trained algorithm of the image process,
each of the devices updates the image process based on the trained algorithm to perform the updated image process.

13. The server system according to claim 10, wherein the update data generated by the server system defines trained connection weight parameters of the image process,
each of the devices updates the connection weight parameter of the image process to perform the image process based on the updated connection weight parameters.

14. The server system according to claim 10, wherein each of the devices is an image recognition device and includes at least one of (i) a camera and (ii) one or more sensors,
the image process performed by each of the devices is an image recognition process,
the vehicle data includes data acquired by the at least one of the camera and one or more sensors,
the connection weight parameter which is updated based on the update data defines a function of the image recognition process performed by each of the devices.

15. A learning system comprising:
a plurality of devices, each of the plurality of devices being installed in a corresponding vehicle of a plurality of vehicles; and
a server system communicably coupled to each of the devices,
each of the devices includes a first control unit having a first microcomputer, the first microcomputer executing code to
perform an image process associated with vehicle data, the image process including a support vector machine algorithm comprised of at least first and second classifiers and a connection weight parameter between the first and second classifiers, the vehicle data being sensed at the corresponding vehicle; and
send, to the server system, as learning data, the vehicle data which is sensed by the corresponding vehicle and is used by the image process,
the server system includes a control unit executing code to
obtain the learning data sent from each of the devices;
perform a learning process on at least the connection weight parameter of the image process using the obtained learning data to generate update data for updating at least the connection weight parameter; and
send the update data to each of the devices,
the first microcomputer of each of the devices further executes code to update at least the image process which is performed by the corresponding device based on the update data sent from the server system,
the first microcomputer of each of the devices further executes code to
obtain a piece of environmental data associated with an area in which the corresponding vehicle is travelling;
perform the image process associated with the corresponding vehicle using the vehicle data of the corresponding vehicle and the corresponding piece of the environmental data;
send, to the server system, a piece of the learning data and the corresponding piece of the environmental data associated with the piece of the learning data;
the second control unit of the server system further executes code to
obtain the piece of the learning data and the piece of the environmental data sent from each of the devices;
categorize the pieces of learning data sent from all of the devices into a plurality of groups of learning data for respective travelable areas, each of the plurality of groups of learning data corresponding to one of the travelable areas being sent from at least one of the devices located in the one of the travelable areas;

perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and send the piece of the update data for each of the groups of learning data to a corresponding one of the devices; and the first microcomputer of each of the devices further executes code to update the image process based on the piece of the update data, the piece of the update data matching with the piece of the environmental data obtained by the corresponding device.

16. A device system comprising:

a plurality of devices, each of the plurality of devices being installed in a corresponding vehicle of a plurality of vehicles, each of the devices comprising:

a first control unit having a first microcomputer, the first microcomputer executing code to perform an image process associated with vehicle data, the image process including a support vector machine algorithm comprised of at least first and second classifiers and a connection weight parameter between the first and second classifiers, the vehicle data being sensed at the corresponding vehicle;

send, to the server system, as learning data, the vehicle data which is sensed at the corresponding vehicle and is used by the image process;

when update data for updating at least the connection weight parameter is sent from the server system as a result of a learning process performed by the server system, receive the update data; and update at least the image process based on the update data received from the server system, the first microcomputer of each of the devices further executes code to obtain a piece of environmental data associated with an area in which the corresponding vehicle is travelling;

perform the image process associated with the corresponding vehicle using the vehicle data and the corresponding piece of the environmental data; and send, to the server system, a piece of the learning data and the corresponding piece of the environmental data;

the server system includes a second control unit;

the second control unit of the server system executes code to obtain the piece of the learning data and the piece of the environmental data sent from each of the devices;

categorize the pieces of learning data sent from all of the devices into a plurality of groups of learning data for respective travelable areas, each of the plurality of groups of learning data corresponding to one of the travelable areas being sent from at least one of the devices located in the one of the travelable areas;

perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and send the piece of the update data for each of the groups of learning data to a corresponding one of the devices; and the first microcomputer of each of the devices further executes code to update the image process based on the piece of the update data, a corresponding one of the pieces of the update data matching with the piece of the environmental data obtained by each of the devices.

17. A server system comprising:

a control unit having a microcomputer, the microcomputer executing code to obtain a piece of learning data sent from each of a plurality of devices, each of the devices being respectively installed in a corresponding vehicle of a plurality of vehicles, the learning data being sent from each of the devices, the learning data being data which is sensed at the corresponding vehicle and is used by the corresponding device during execution of an image process associated with the corresponding vehicle, the image process including a support vector machine algorithm comprised of at least first and second classifiers and a connection weight parameter between the first and second classifiers;

perform a learning process on at least the connection weight parameter of the image process using the obtained learning data to generate update data for updating at least the connection weight parameter; and send the update data to each of the devices, wherein:

when the learning data is sent from each of the vehicles, the control unit of the server system further executes code to obtain the piece of learning data and a piece of environmental data sent from each of the devices, the piece of the environmental data being associated with an area in which the corresponding vehicle is travelling;

categorize the pieces of learning data sent from all of the devices into a plurality of groups of learning data for respective travelable areas, each of the plurality of groups of learning data corresponding to one of the travelable areas being sent from at least one of the devices located in the one of the travelable areas;

perform, for each of the groups of learning data, the learning process on at least the connection weight parameter of the image process using the corresponding group of learning data while considering a traffic environment of the corresponding travelable area to which the corresponding group of learning data belongs to generate a piece of the update data for the corresponding group of learning data to update the image process; and send the piece of the update data for each of the groups of learning data to a corresponding one of the devices.

* * * * *